(12) United States Patent
Adent et al.

(10) Patent No.: US 7,747,854 B2
(45) Date of Patent: *Jun. 29, 2010

(54) ADVANCED STREAM FORMAT (ASF) DATA STREAM HEADER OBJECT PROTECTION

(75) Inventors: Daniel Adent, Bellevue, WA (US); Cory West, Central Point, OR (US); Ptratul Dublish, Sammamish, WA (US); Clifford P Strom, Sammamish, WA (US); Brian D. Crites, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 6 days.

This patent is subject to a terminal disclaimer.

(21) Appl. No.: 12/098,524

(22) Filed: Apr. 7, 2008

(65) Prior Publication Data

US 2008/0189552 A1 Aug. 7, 2008

Related U.S. Application Data

(63) Continuation of application No. 10/235,587, filed on Sep. 4, 2002, now Pat. No. 7,401,221.

(51) Int. Cl.
*H04L 29/06* (2006.01)
*H04J 3/16* (2006.01)
*G06F 15/16* (2006.01)

(52) U.S. Cl. .................. 713/160; 370/471; 709/217

(58) Field of Classification Search ................ 713/160; 370/471; 709/217
See application file for complete search history.

(56) References Cited

U.S. PATENT DOCUMENTS

| 5,915,024 | A | 6/1999 | Kitaori et al. ............... 713/176 |
| 6,041,345 | A | 3/2000 | Levi et al. .................... 709/217 |
| 6,134,243 | A * | 10/2000 | Jones et al. .................. 370/465 |
| 6,135,646 | A | 10/2000 | Kahn et al. .................. 709/217 |
| 6,367,012 | B1 * | 4/2002 | Atkinson et al. ............ 713/176 |
| 6,367,013 | B1 * | 4/2002 | Bisbee et al. ................ 713/178 |
| 6,415,385 | B1 * | 7/2002 | Cotugno et al. ............. 713/176 |
| 6,484,156 | B1 * | 11/2002 | Gupta et al. ................... 707/1 |
| 6,611,534 | B1 | 8/2003 | Sogabe et al. ................ 370/471 |
| 6,671,805 | B1 | 12/2003 | Brown et al. ................. 713/176 |

(Continued)

FOREIGN PATENT DOCUMENTS

JP 2002-091303 3/2002

OTHER PUBLICATIONS

Edge, B., "Stream and File Formats-Where are We Now?", *SMPTE Journal*, Jul.-Aug. 2002, 111(6-7), 319-322.

(Continued)

*Primary Examiner*—Techane J Gergiso
(74) *Attorney, Agent, or Firm*—Woodcock Washburn LLP

(57) ABSTRACT

A header object for a data file is comprised of sub-objects which specify properties of the data stream and contains information needed to properly verify and interpret the information within the data object. In order to allow the protection of any set of sub-objects without requiring that the sub-objects follow any specific ordering, a new sub-object is introduced which includes region specifiers identifying regions within sub-objects and verification information for those regions. This new sub-object in the header object allows the modification of non-protected regions and reorganization of sub-objects in a header without invalidating verification information.

52 Claims, 5 Drawing Sheets

U.S. PATENT DOCUMENTS

| | | | | |
|---|---|---|---|---|
| 6,751,623 | B1 | 6/2004 | Basso et al. | 707/101 |
| 6,795,919 | B1 | 9/2004 | Gibbs et al. | 713/170 |
| 6,796,489 | B2* | 9/2004 | Slater et al. | 235/379 |
| 6,836,791 | B1* | 12/2004 | Levi et al. | 709/217 |
| 6,985,966 | B1 | 1/2006 | Gupta et al. | 709/248 |
| 6,990,585 | B2 | 1/2006 | Manuyama et al. | 713/176 |
| 7,051,275 | B2* | 5/2006 | Gupta et al. | 715/201 |
| 7,246,318 | B2* | 7/2007 | Debique et al. | 715/734 |
| 7,302,490 | B1* | 11/2007 | Gupta et al. | 709/231 |
| 7,451,229 | B2* | 11/2008 | Klemets et al. | 709/236 |
| 7,457,312 | B2* | 11/2008 | Weiss et al. | 370/468 |
| 2002/0002468 | A1* | 1/2002 | Spagna et al. | 705/1 |
| 2002/0040431 | A1* | 4/2002 | Kato et al. | 713/168 |
| 2002/0062313 | A1 | 5/2002 | Lee et al. | 707/3 |
| 2002/0069389 | A1 | 6/2002 | Sollish et al. | 714/758 |
| 2002/0103970 | A1 | 8/2002 | Gut et al. | 711/118 |
| 2002/0131761 | A1 | 9/2002 | Kawasaki et al. | 386/65 |
| 2003/0236902 | A1* | 12/2003 | Weiss et al. | 709/231 |
| 2003/0236912 | A1* | 12/2003 | Klemets et al. | 709/236 |

OTHER PUBLICATIONS

Grossman, S., "Software Development Kits Speed MPEG-4 Product Designs", *Electronic Design*, 2001, 49(10), 54-56.

Kline, C.S. et al., "Digital Signatures: Principle and Implementations", *Journal of Telecommunication Networks*, 1983, 2(1), 61-81.

Ruland, C. et al., "Signing Digital Streams", $4^{th}$ *International Conference Source and Channel Coding-ITG-Fachbericht*(Germany), 2002, 170, 325-334.

Schneier, B. et al., "Automatic Event-Stream Notarization Using Digital Signatures", *Security Protocols. International Workshop Proceedings*, 1997, 155-169.

Pannetrat, A. et al., "Authenticationg Real Time Packet Streams and Multicasts", *Proceedings ISCC 2002 $7^{th}$ International Symposium on Computers and Communications*, 2002, 490-495.

Eastlake, D. et al., "(Extensible Markup Language) XML-Signature Syntax and Processing", *Network Working Group, Standards Track*, 2002, 1-74, XP015009053.

Maruyama et al., "Digital Signature in XML Document", Computer Security Symposium, Collection 1998, Oct. 29, 1998, 165-170 (Abstract).

Office Action dated Dec. 18, 2009 from related JP application No. 2003-313204.

* cited by examiner

ADVANCED STREAM FORMAT (ASF) DATA STREAM HEADER OBJECT PROTECTION

CROSS-REFERENCE

This application is a continuation of U.S. patent application Ser. No. 10/235,587, filed Sep. 4, 2002, the contents of which is incorporated herein by reference in its entirety.

FIELD OF THE INVENTION

The present invention relates generally to data verification, and more particularly to a header object for a data file.

BACKGROUND OF THE INVENTION

Conventionally, some data file and data stream formats include header objects. The header object includes "meta-content" information used for identifying and using the content data included in the data file or data stream.

For example, one data stream format is the Advanced Streaming Format (ASF), which is an extensible file format designed to store coordinated multimedia data. ASF supports data delivery over a wide variety of networks and protocols while allowing for local playback.

Each ASF file is composed of one or more media streams. The header object specifies the properties of the entire file, along with stream-specific properties. In ASF, each file must have one header object. The header object provides a well-known byte sequence at the beginning of ASF files (the header object GUID (globally unique identifier)) and to contain all the information needed to properly interpret the multimedia data. The header object may be thought of as a container that contains header object information and a combination of header sub-objects. The header object information consists of a GUID for the header object ("ASF_Header_Object"), the size of the header object, and the number of header sub-objects contained in the header object. Each header object begins with a GUID.

Header sub-objects include:
- A file properties sub-object, which defines the global characteristics of the multimedia data in the file;
- A stream properties sub-object, which defines the specific properties and characteristics of a media stream;
- The header extension sub-object, which allows additional functionality to be added to an ASF file while maintaining backwards compatibility, and is a container containing extended header sub-objects;
- The codec list sub-object, which provides user-friendly information about the codecs and formats used to encode the content found in the ASF file;
- The script command sub-object, which provides a list of type/parameter pairs of Unicode strings that are synchronized to the ASF file's timeline;
- The marker sub-object, which contains a small, specialized index that is used to provide named jump points within a file to allow a content author to divide content into logical sections, such as song boundaries in an entire CD or topic changes during a long presentation, and to assign a human-readable name to each section of a file for use by the user;
- The bitrate mutual exclusion sub-object, which identifies video streams that have a mutual exclusion relationship to each other (in other words, only one of the streams within such a relationship can be streamed and the rest are ignored);
- The error correction sub-object, which defines the error correction method and provides information needed by the error correction engine for recovery;
- The content description sub-object, which permits authors to record well-known data describing the file and its contents, including title, author, copyright, description, and rating information;
- The extended content description sub-object, which permits authors to record data describing the file and its contents that is beyond the standard bibliographic information such as title, author, copyright, description, or rating information;
- The content encryption sub-object, which identifies if the content is protected by a digital rights management (DRM) system. This sub-object includes the DRM license-acquisition URL, the DRM Key ID, and other DRM-related metadata.
- The stream bitrate properties sub-object, which defines the average bitrate of each media stream in the multimedia data; and
- A padding sub-object, which is a dummy sub-object used to pad out the size of the header object.

The entity which first creates the data stream file and any successive entities acting on it may add or change elements of the header file. For example, a content-creating entity may create a data stream file, and include information in the content description object regarding the content. A second entity may create markers within the data, and wish to add a marker object with track information. And a third entity, which distributes the data stream file, may add a script command object containing actions or data for scripts. For example, a script command object may contain information that opens a web browser window to a specified URL (uniform resource locator).

Because a number of entities may act on an ASF file, there is no way to determine which entity has created which part of the header object. Additionally, a change of information by an attacker cannot be identified.

SUMMARY OF THE INVENTION

The present invention is directed to a system, method, and data structure for the verification of sub-objects in a header object. The invention allows for verification by one entity of one or more sub-objects in the header object while still allowing the ordering of sub-objects to change. New sub-objects can also subsequently be created and verified by another entity. The verification of two or more sub-objects by a trusted entity may be combined, so that an attacker can not remove or change data leaving one sub-object verifiable as having been signed by the trusted entity while the other sub-object is not verifiable. A digital signature may be produced based on data in the header object and validated for a region in the header object.

Additional features and advantages of the invention are set forth in the description below.

DETAILED DESCRIPTION OF THE PREFERRED EMBODIMENTS

Overview

One or more digital signature sub-objects can be created and placed in the header object of a data file to allow for signature information for sub-objects and regions of sub-objects in the header object. If a digital signature sub-object is present and valid, any editing or tampering with the signed sub-objects can be detected. Ordering of the sub-objects need not be preserved.

The digital signature sub-object contains an array of region specifiers. Each region specifier identifies a specific region within a sub-object. A region specifier may also identify a complete sub-object.

The digital signature sub-object also contains a signature. The signature is a digital signature of the regions listed in the array of region specifiers. The signature can be used to verify that the regions listed in the region specifier array have not been tampered with.

Exemplary Computing Environment

Figure 1:
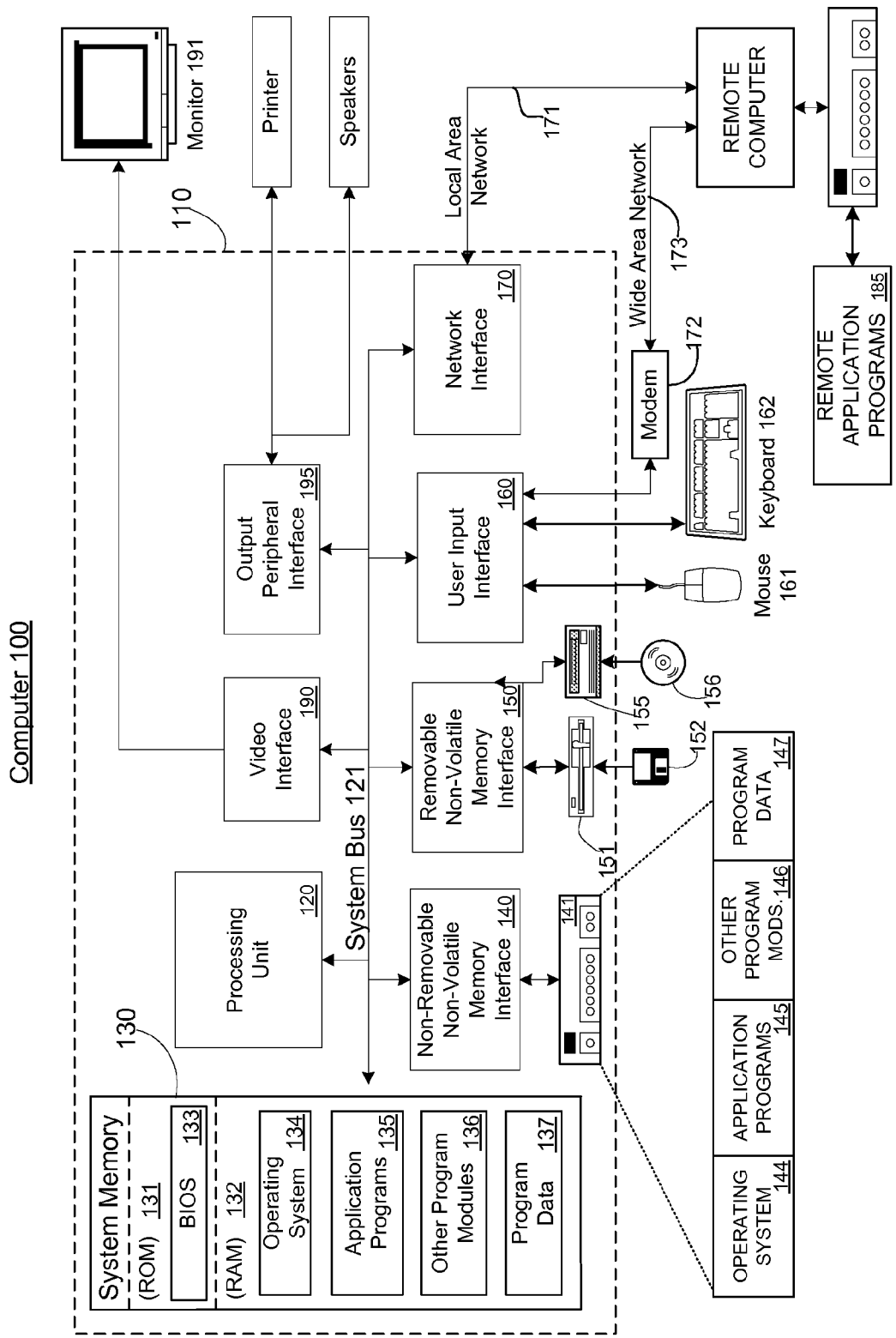
FIG. 1 is a diagram illustrating an overview of a computer system.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may be used in connection with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices. Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may utilize the techniques of the present invention.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium that can be used to store the desired information and that can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Digital Signature Sub-Objects

Where a header object includes sub-objects and regions of sub-objects to be protected, according to the invention, a digital signature sub-object may be added to the header in order to allow verification that the sub-objects and regions signed have not been tampered with. This digital signature sub-object may be based on any digital signing algorithm that takes as input some data and produces a signature that can later be verified. In one embodiment, the algorithm used is the RSA algorithm. In another embodiment, the elliptic curve algorithm is used. Other embodiments may use other signature algorithms.

Figure 2:
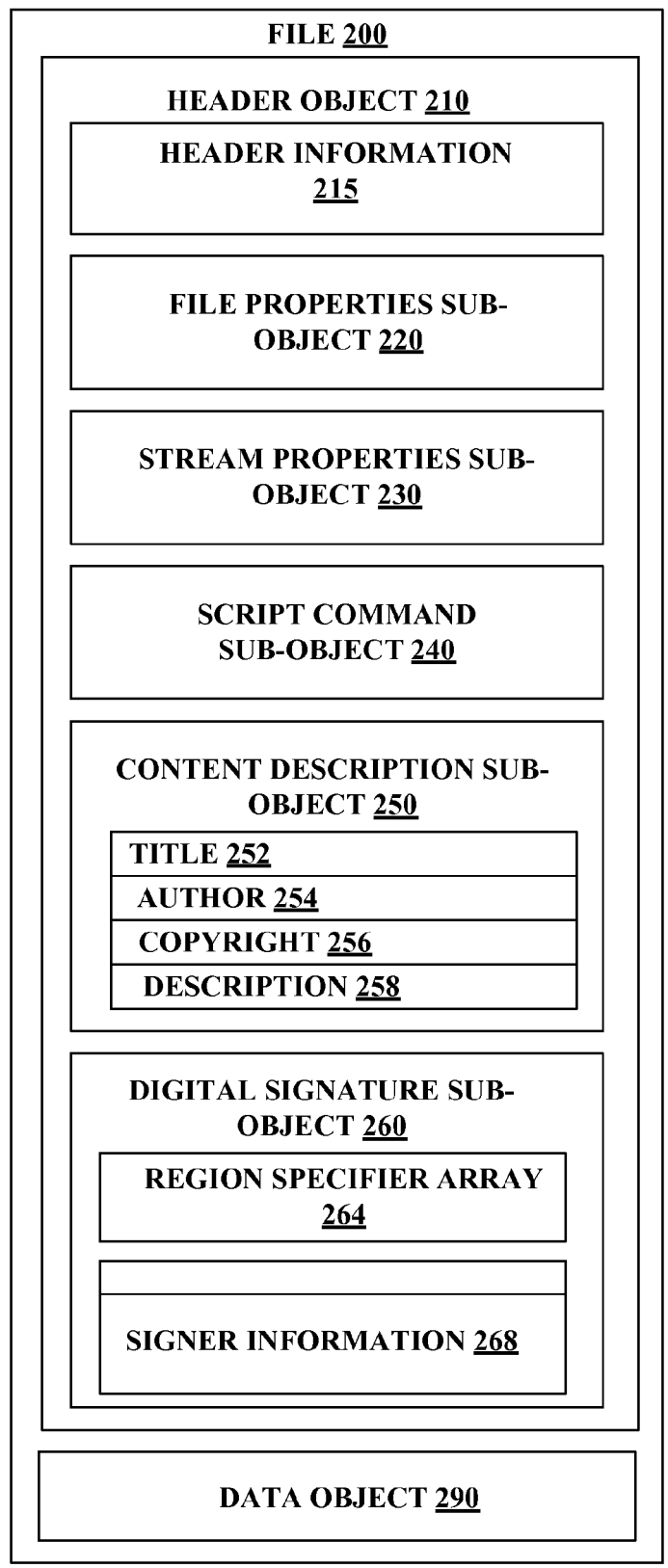
FIG. 2 is a block diagram illustrating a file according to the invention.

Referring to FIG. 2, file 200 contains a header object 210. In addition to header information 215, header object 210 contains a file properties sub-object 220, a stream properties sub-object 230, a script command sub-object 240, and content description sub-object 250. Content description sub-object 250 contains information on title 252, author 254, copyright 256 and description 258 of the content. Script command sub-object 240 contains a URL. File 200 also contains data object 290. This figure is exemplary, and it will be recognized that other combinations of sub-objects may be present in the header object rather than those shown.

An entity may prevent tampering with parts of the header object 210 by adding digital signature sub-object 260. Digital signature sub-object 260 contains region specifier array 264 and signature. In one embodiment, digital signature sub-object 260 also contains signer information 268. In one embodiment, signer information 268 contains one or more certificates which can be used to securely verify the signature.

Figure 3:
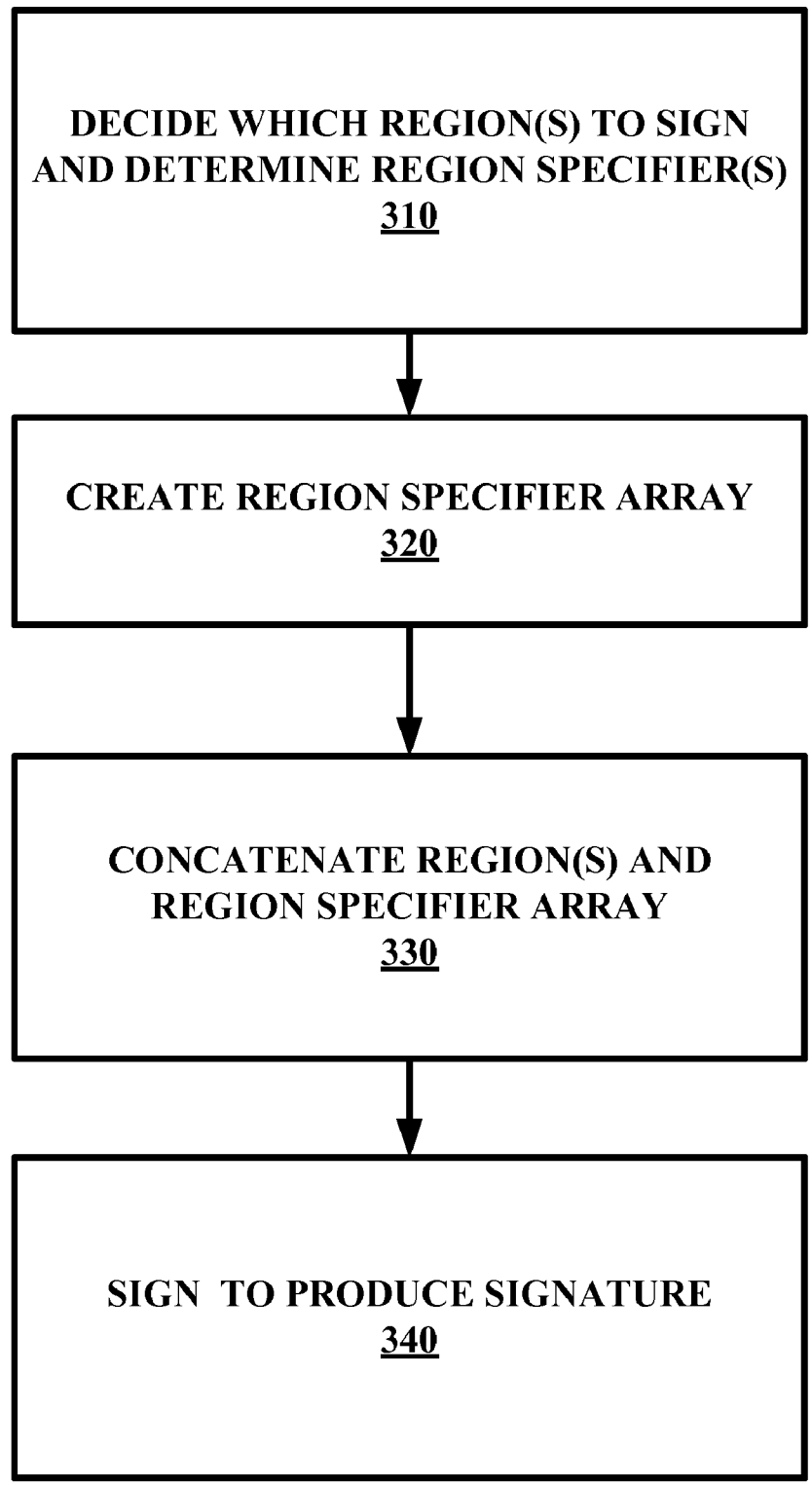
FIG. 3 illustrates the process of creating a digital signature sub-object according to the invention.

The process for creating a digital signature sub-object 260 is shown in FIG. 3. As shown in step 310, the entity decides which one or more regions of header sub-objects it is going to sign and determines the region specifiers for these regions. For example, with reference to FIG. 2, the regions to be signed may include the script command sub-object 230 and the title, author, and copyright sections of the content description sub-object 250. Referring again to FIG. 3, in step 320, the region specifier array 264 (from FIG. 2) is created. In step 330, the regions specified in the region specifier array 264 are concatenated (in the order in which they are specified in the region specifier array 264) along with the region specifier array 264. This region is then signed 340 to produce signature 266 (from FIG. 2).

When a file containing a header object including a digital signature sub-object is modified, the order of the sub-objects may be changed and additional sub-objects may be inserted. If additional regions or sub-objects are to be verified, a new digital signature sub-object may be added.

Figure 4:
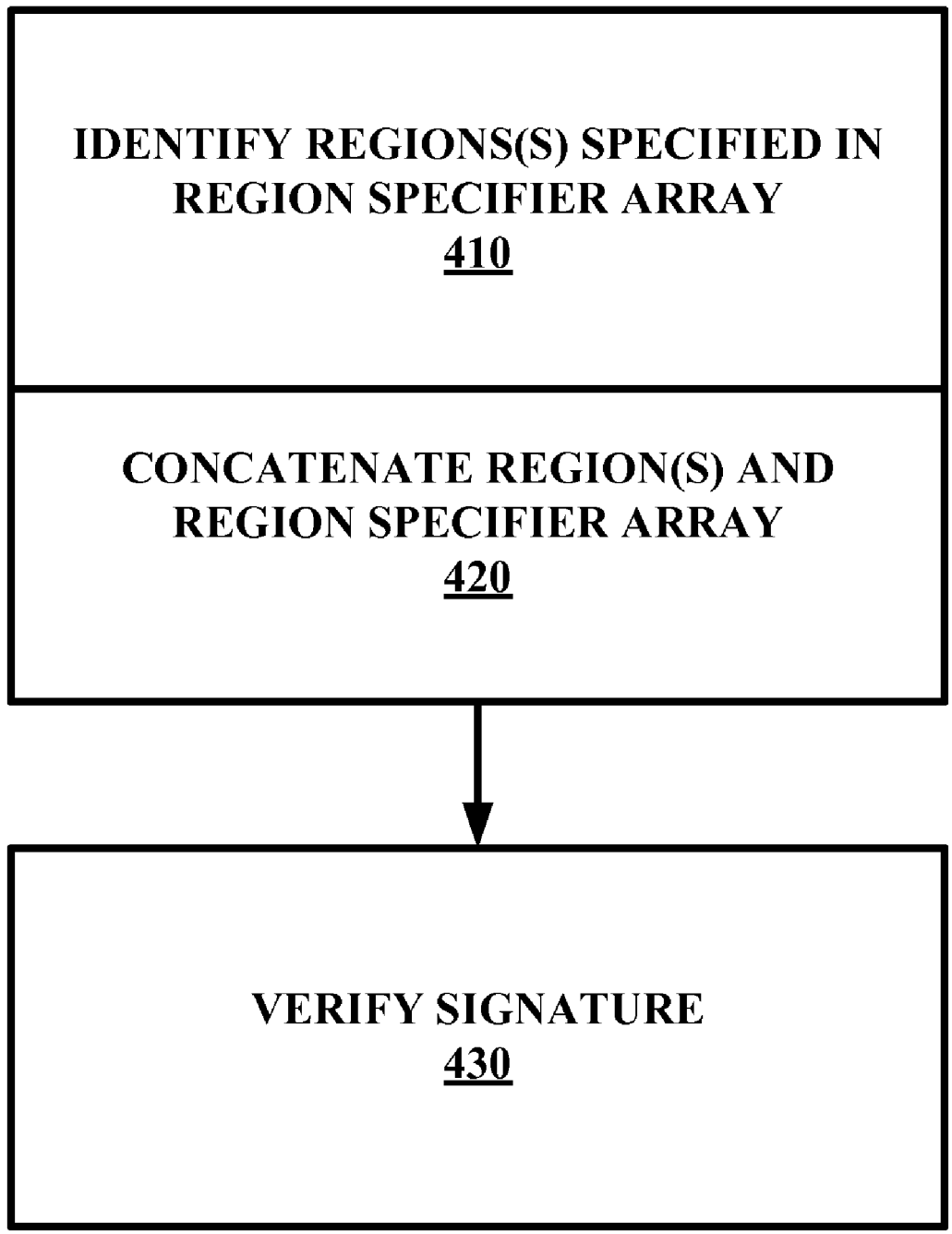
FIG. 4 illustrates the process of verifying a digital signature sub-object according to the invention.

With reference to FIG. 2, in order to check the verification of the header object 210, the digital signature sub-object 260 and the regions specified in the region specifier array 264 are used. As shown in FIG. 4, step 410, the header sub-object regions specified in the region specifier array 264 (from FIG. 2) are identified. In step 420, these regions are concatenated (in the order in which they are specified in the region specifier array 264) together with the region specifier array 264. In step 430, signature 266 (from FIG. 2) is checked to determine whether it is a valid signature for the concatenation.

In one embodiment of the invention, both regions of sub-objects and complete sub-objects may be signed using the digital signature sub-object. In another embodiment, only complete sub-objects may be signed. In one embodiment of the invention, more than one region from a single sub-object may be signed in one digital signature sub-object. In one embodiment of the invention, the regions of one sub-object being signed may overlap.

In one embodiment of the invention, each header object must contain at least one digital signature sub-object. If the header object does not contain a digital signature sub-object when one is expected, then it can be assumed that the header object has been tampered with. If the header object contains a digital signature sub-object that does not verify correctly or is not from a trusted source, the entity receiving the file containing the header object may act accordingly, for example, in one implementation, by not using the file. According to this embodiment, a check is performed to see if any digital signature sub-objects exist. If none exist, then verification fails. If sub-objects do exist, each one is checked to yield a verification result.

In one embodiment, any file F that is a collection of objects $O_1, O_2 \ldots O_n$. On may be signed according to the invention. A new object $O_{DS}$ is created which includes a region specifier array specifying the objects or regions of objects signed and a signature for those objects and the array.

Exemplary ASF Implementation

Figure 5:
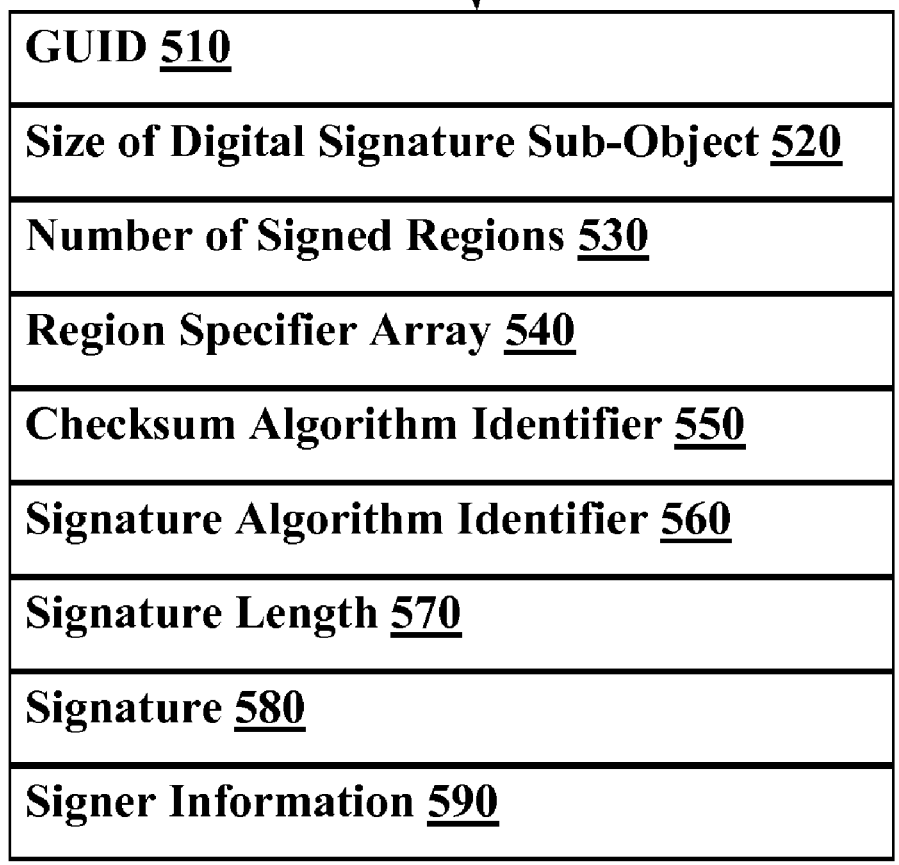
FIG. 5 illustrates a digital signature sub object according to the invention.

In one embodiment, the file is an ASF file. The components of a digital signature sub-object for an ASF file, in one embodiment, is shown in FIG. 5. Digital signature sub-object 500 includes a GUID 510. Each object and sub-object in an ASF file begins with a GUID. GUIDs are used to uniquely identify all objects types within ASF files. Each ASF object type has its own unique GUID. However, in general, GUIDs cannot be used to uniquely identify sub-objects within an ASF Header object since multiple sub-objects in an ASF Header object may have the same object type, and thus have the same GUID.

The next element in the exemplary ASF digital signature sub-object 500 is the sub-object size 520. Again, all ASF objects and sub-objects generally include the size of the object and sub-object. The region specifier array 540, as described above, is preceded by the number of signed regions contained in the region specifier array 530. The checksum algorithm identifier 550 and the signature algorithm identifier 560 identify the checksum and signature algorithms used in the digital signature sub-object. The signature 580 of the regions and the region specifier array is preceded by the length of the signature 570. Signer information 590 contains information needed to verify or obtain information regarding the signer. Signer information 590 may include the identity of the signer. In one embodiment, signer information 590 contains a certificate chain that can be used to verify the public key of the signer is from a trusted source.

In the exemplary ASF implementation, each region specifier contains a sub-object region offset, a sub-object region size, a checksum length and an object checksum. The region offset identifies where the region starts in the sub-object, and the region size identifies the size of the region. The object checksum corresponds to the checksum of the region specified. This checksum algorithm, in a preferred embodiment, is the Secure Hash Algorithm (SHA-1) algorithm. This algorithm is available in the Federal Information Processing Standards Publication 180-1. In alternate embodiments, any hashing algorithm with a low probability of collision can be used. In an alternate embodiment, the object checksum corresponds to the checksum of the sub-object containing the region specified.

When the signature is being checked, in order to determine which sub-object the region is located in (as in step 410 of FIG. 4), the header sub-objects are examined. For each sub-object being examined, a checksum is computed according to the algorithm specified in the checksum algorithm identifier 550. In the embodiment where the checksum is computed over the region, a checksum is computed for the data contained in that sub-object which begins at the given sub-object region offset and extends to be the given sub-object region size. In the embodiment where the checksum is computed over the entire sub-object, a checksum is computed for the sub-object. When a checksum is computed which matches the checksum in the region specifier, the correct sub-object for the region specifier has been identified. When a sub-object corresponding to each region specifier has been identified, the signature can be checked.

In this implementation, in order to specify an entire sub-object to be signed, the offset in the region specifier will be zero, and the region size will be equal to the length of the sub-object. In another embodiment, the checksum is computed for the entire sub-object rather than for the specified region.

In this embodiment, more than one digital signature sub-object may be included in an object, in order to allow flexibility in having different areas of sub-objects verified together, and having different entities verify sub-objects.

In other embodiments, other methods may be used to identify the regions. In one embodiment, data which can uniquely identify the sub-object is contained within the region specifier along with region offset and size data.

In other embodiments, only entire sub-objects may be signed. In one embodiment, the region specifier includes a checksum over the entire sub-object. In another embodiment, the length of the checksum is also included. In yet another embodiment, other data that can identify the sub-object is used in the region specifier.

CONCLUSION

Herein a system and method for data stream header object protection. As mentioned above, while exemplary embodiments of the present invention have been described in connection with various computing devices and network architectures, the underlying concepts may be applied to any computing device or system in which it is desirable to provide data stream header object protection. Thus, the techniques for providing data stream header object protection in accordance with the present invention may be applied to a variety of applications and devices. For instance, the techniques of the invention may be applied to the operating system of a computing device, provided as a separate object on the device, as part of another object, as a downloadable object from a server, as a "middle man" between a device or object and the network, as a distributed object, etc. While exemplary names and examples are chosen herein as representative of various choices, these names and examples are not intended to be limiting.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the techniques of the present invention, e.g., through the use of a data processing API or the like, are preferably implemented in a high level procedural or object oriented programming language to communicate with a computer system. However, the program (s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

We claim:

1. A method implemented by at least one computing system comprising a processor for use with an object comprising a plurality of sub-objects, said method providing a digital signature for at least one region, where said at least one region is comprised of all or part of one of at least one sub-object within said plurality of sub-objects, the method comprising:
   creating an array using the at least one computing system comprising, for said at least one region, a region specifier identifying the at least one region, where the region specifier comprises a checksum calculated according to a checksum algorithm;
   producing the digital signature based on data comprising each region and said array;
   adding a signature sub-object comprising said array and said digital signature to the object, where said sub-objects within the object are rearranged within the object without invalidating the digital signature; and
   storing said object in memory, wherein said memory is communicatively coupled to the processor.

2. The method of claim 1, where said at least one region comprises a sub-object from among said plurality of sub-objects.

3. The method of claim 1, where said checksum is calculated for the at least one region.

4. The method of claim 1, where said checksum is calculated for all or a portion of at least one of said plurality of sub-objects contained in the region.

5. The method of claim 1, where said signature sub-object comprises a checksum algorithm identifier identifying the checksum algorithm used.

6. The method of claim 1, where the region specifier comprises a checksum length.

7. The method of claim 1, where said signature sub-object comprises a signature algorithm identifier identifying a signature algorithm used for said producing of a digital signature.

8. The method of claim 1, where said signature sub-object comprises signer identifier identifying a signer for verification of said digital signature.

9. The method of claim 8, where said signer identifier comprises digital certificates for securely identifying and verifying a public key of said signer.

10. The method of claim 1, where the region specifier comprises a region offset identifying a start location of the corresponding region in a sub-object.

11. The method of claim 1, where the region specifier comprises a region size identifying a size of the corresponding region in a sub-object.

12. The method of claim 1, where said object is a header object for an ASF file.

13. The method of claim 12, where said header object further comprises a GUID.

14. A method for validating a digital signature for use with an object comprising a plurality of sub-objects and is implemented by at least one computing system comprising a processor, said method comprising:
   identifying at least one region corresponding to a region specifier, where the region specifier comprises a checksum calculated according to a checksum algorithm, and the at least one region comprises all or part of one of at least one sub-object within said plurality of sub-objects;
   creating an object comprising an array including the region specifier, said at least one region corresponding to said region specifier;

validating said digital signature on said object for said at least one region using the at least one computing system, wherein said sub-objects are rearrangable within the object without invalidating the digital signature; and storing said object in memory, wherein said memory is communicatively coupled to the processor.

15. The method of claim 14, where said object is a header object for an ASF file.

16. A method for validating a digital signature for use with an object comprising a plurality of sub-objects and is implemented by at least one computing system comprising a processor, said method comprising:

determining a number of digital signatures present in said object, wherein at least one region comprises all or part of one of at least one sub-object of the plurality of sub-objects and an array comprising at least one region specifier for each of said at least one region, the at least one region specifier comprising a checksum calculated according to a checksum algorithm;

validating each of said digital signatures for said at least one region using the at least one computing system, wherein said sub-objects are rearrangable within the object without invalidating the digital signature; and storing said object in memory, wherein said memory is communicatively coupled to the processor.

17. The method of claim 16, further comprising:
returning an error value if the number of digital signatures present in said object is zero.

18. A computer-readable storage medium for use with an object comprising a plurality of sub-objects, said computer-readable storage medium providing a digital signature for at least one region, where said at least one region is comprised of all or part of one of at least one sub-object within said plurality of sub-objects, the computer-readable storage medium comprising instructions for:

creating an array comprising, for said at least one region, a region specifier identifying the at least one region, where the region specifier comprises a checksum calculated according to a checksum algorithm;

producing the digital signature based on data comprising each region and said array; and adding a signature sub-object comprising said array and said digital signature to the object, where said sub-objects are rearranged within the object without invalidating the digital signature.

19. The computer-readable storage medium of claim 18, where said at least one region comprises a sub-object from among said plurality of sub-objects.

20. The computer-readable storage medium of claim 19, where the region specifier comprises a checksum length.

21. The computer-readable storage medium of claim 18, where said checksum is calculated for the at least one region.

22. The computer-readable storage medium of claim 18, where said checksum is calculated for all or a portion of at least one of said plurality of sub-objects contained in the region.

23. The computer-readable storage medium of claim 18, where said signature sub-object comprises a checksum algorithm identifier identifying the checksum algorithm used.

24. The computer-readable storage medium of claim 18, where said signature sub-object comprises a signature algorithm identifier identifying a signature algorithm used for said producing of a digital signature.

25. The computer-readable storage medium of claim 18, where said signature sub-object comprises signer identifier identifying a signer for verification of said digital signature.

26. The computer-readable storage medium of claim 25, where said signer identifier comprises digital certificates for securely identifying and verifying a public key of said signer.

27. The computer-readable storage medium of claim 18, where the region specifier comprises a region offset identifying a start location of the corresponding region in a sub-object.

28. The computer-readable storage medium of claim 18, where the region specifier comprises a region size identifying a size of the corresponding region in a sub-object.

29. The computer-readable storage medium of claim 18, where said object is a header object for an ASF file.

30. The computer-readable storage medium of claim 29, where said header object further comprises a GUID.

31. A computer-readable storage medium for validating a digital signature for use with an object comprising a plurality of sub-objects, said computer-readable storage medium comprising instructions for:

identifying at least one region corresponding to a region specifier, where the region specifier comprises a checksum calculated according to a checksum algorithm, and the at least one region comprises all or part of one of at least one sub-object within said plurality of sub-objects;

creating a data object comprising an array for including the region specifier and the at least one region corresponding to the region specifier;

validating said digital signature on said data object for said at least one region, wherein said sub-objects are rearrangable within the object without invalidating the digital signature.

32. The computer-readable storage medium of claim 31, where said object is a header object for an ASF file.

33. A computer-readable storage medium for validating a digital signature for use with an object comprising a plurality of sub-objects, said computer-readable storage medium comprising instructions for:

determining a number of digital signatures present in said object, wherein at least one region comprises all or part of one of at least one sub-object of the plurality of sub-objects and an array comprises a region specifier for the at least one region, the region specifier comprising a checksum calculated according to a checksum algorithm; and validating each of said digital signatures for the at least one region, wherein said sub-objects are rearrangable within the object without invalidating the digital signature.

34. The computer-readable storage medium of claim 33, further comprising:
returning an error value if the number of digital signatures present in said object is zero.

35. A system for use with a header object comprising a plurality of sub-objects, the system comprising:

at least one hardware processor programmed for creating an array comprising, for each of at least one region, a region specifier identifying the at least one region, wherein each of said at least one region is comprised of all or part of one of at least one sub-object within said plurality of sub-objects;

said at least one hardware processor programmed for producing a digital signature based on data comprising the at least one region and said array; and said at least one hardware processor programmed for adding a signature sub-object comprising said array and said digital signature to the header object, wherein said plurality of sub-objects are rearranged within the header object without invalidating the digital signature.

36. The system of claim 35, where each of said at least one region comprises a sub-object from among said plurality of sub-objects.

37. The system of claim 35, where the region specifier comprises a checksum calculated according to a checksum algorithm.

38. The system of claim 37, where said checksum is calculated for the at least one region.

39. The system of claim 37, where said checksum is calculated for the all or a portion of at least one of said plurality of sub-objects contained in the at least one region.

40. The system of claim 37, where said signature sub-object comprises a checksum algorithm identifier identifying the checksum algorithm used.

41. The system of claim 37, where the region specifier comprises a checksum length.

42. The system of claim 35, where said signature sub-object comprises a signature algorithm identifier identifying a signature algorithm used for said producing of a digital signature.

43. The system of claim 35, where said signature sub-object comprises signer identifier identifying a signer for verification of said digital signature.

44. The system of claim 43, where said signer identifier comprises digital certificates for securely identifying and verifying a public key of said signer.

45. The system of claim 35, where the region specifier comprises a region offset identifying a start location of the corresponding region in a sub-object.

46. The system of claim 35, the region specifier comprises a region size identifying a size of the corresponding region in a sub-object.

47. The system of claim 35, where said header object is a header object for an ASF file.

48. The system of claim 47, where said header object further comprises a GUID.

49. A system for use with a header object comprising a plurality of sub-objects the system comprising:
   at least one hardware processor programmed for identifying at least one region comprising all or part of one of at least one sub-object within said plurality of sub-objects, wherein an array comprises a region specifier for each of said at least one region;
   said at least one hardware processor programmed for creating a digital signature sub-object comprising said array and, for the region specifier, said region corresponding to said region specifier; and
   said at least one hardware processor programmed for validating the digital signature on said header object for at least one region, wherein the sub-objects are rearrangeable within the header object without invalidating the digital signature.

50. The system of claim 49, where said header object is a header object for an ASF file.

51. A system for use with a header object comprising a plurality of sub-objects, the system comprising:
   at least one hardware processor programmed for determining a count of digital signatures present in said header object, wherein at least one region comprises all or part of one of at least one sub-object within said plurality of sub-objects, said at least one region comprising a digital signature validated for said at least one region, and an array comprises a region specifier for each of said at least one region; and
   said at least one hardware processor programmed for validating each of said digital signatures, wherein the sub-objects are rearrangeable within the header object without invalidating the digital signatures.

52. The system of claim 51 said system further comprising returning an error value if the count of digital signatures present in said header object is zero.

* * * * *